United States Patent
Martin et al.

(10) Patent No.: US 7,402,793 B2
(45) Date of Patent: Jul. 22, 2008

(54) SYSTEM AND METHOD FOR CONTROLLING AND ENERGIZING A ROTATING OBJECT

(75) Inventors: John R. Martin, Rockford, IL (US); Thomas Myers, Machesney Park, IL (US); Patrick G. Rice, Loves Park, IL (US)

(73) Assignee: Arachnid, Inc., Rockford, IL (US)

( * ) Notice: Subject to any disclaimer, the term of this patent is extended or adjusted under 35 U.S.C. 154(b) by 139 days.

(21) Appl. No.: 11/363,795

(22) Filed: Feb. 28, 2006

(65) Prior Publication Data

US 2006/0192091 A1    Aug. 31, 2006

Related U.S. Application Data

(60) Provisional application No. 60/657,292, filed on Feb. 28, 2005, provisional application No. 60/715,421, filed on Sep. 9, 2005.

(51) Int. Cl.
*H04B 10/00* (2006.01)
*F41J 3/00* (2006.01)

(52) U.S. Cl. .................. 250/231.14; 273/404

(58) Field of Classification Search ............. 250/221, 250/222.1, 231.13, 231.14, 231.18; 273/368, 273/404, 408
See application file for complete search history.

(56) References Cited

U.S. PATENT DOCUMENTS

| | | | | |
|---|---|---|---|---|
| 5,496,039 | A * | 3/1996 | Zammuto | 273/368 |
| 5,859,719 | A * | 1/1999 | Dentai et al. | 398/141 |
| 6,316,763 | B1 * | 11/2001 | Appleyard et al. | 250/221 |
| 2004/0208600 | A1 | 10/2004 | Guenter | |

FOREIGN PATENT DOCUMENTS

| | | |
|---|---|---|
| EP | 1 469 617 | 10/2004 |
| EP | 1469617 A2 * | 10/2004 |

OTHER PUBLICATIONS

International Search Report for PCT/US2006/007052 mailed Oct. 9, 2006.

Invitation to Pay Additional Fees and Partial Internation Search Report mailed Jul. 21, 2006 for PCT/US2006/007052.

* cited by examiner

*Primary Examiner*—John R. Lee
(74) *Attorney, Agent, or Firm*—McAndrews, Held & Malloy, Ltd.

(57) ABSTRACT

A system for transferring power between components includes a first object having a light emitter operatively connected to a power source, and a second object having a light receiver operatively connected to a power storage unit. The light receiver receives light emitted from the light emitter and converts the received light into electricity that is stored in the power storage unit.

24 Claims, 2 Drawing Sheets

SYSTEM AND METHOD FOR CONTROLLING AND ENERGIZING A ROTATING OBJECT

RELATED APPLICATIONS

This application relates to and claims priority benefits from U.S. Provisional Patent Application 60/657,292 entitled "System and Method for Communicating Between Parts of a Machine," filed Feb. 28, 2005, which is hereby incorporated by reference in its entirety. This application also relates to an claims priority benefits from U.S. Provisional Patent Application 60/715,421 entitled "Activation System for a Rotatable Object," filed Sep. 9, 2005, which is also hereby incorporated by reference in its entirety.

BACKGROUND OF THE INVENTION

Embodiments of the present invention generally relate to a system and method of controlling and energizing a rotatable object, such as a rotating dartboard of a dart game system. In particular, embodiments of the present invention relate to communicating between parts of a machine, and more particularly, to a system and method of transferring energy and/or data between objects that are not physically connected to one another. Additionally, embodiments of the present invention also relate to an activation/deactivation system for a rotatable object, such as a rotatable dart board of a dart game machine, and more particularly to a switchless control system for a rotatable object.

Various systems include numerous internal parts that utilize electrical or other energy to operate. Typically, each device to be powered is connected to a power source in a conventional manner (e.g., wired to an electrical outlet). However, such conventional power sources occupy space. As more components are used within a system, more space is needed to accommodate the components and power sources.

Thus, a need exists for a system and method of efficiently transferring power between components of a system while without taking up too much space.

Additionally, various rotating mechanisms are automatically rotated through motors, which are operatively connected to the rotating mechanisms through drive axles. In order to start rotation of a particular rotating mechanism, a switch that is operatively connected to the motor is positioned in an "ON" position. In order to cease rotation, the switch is positioned in an "OFF" position.

Manipulating the switch mechanism may be difficult for various reasons. For example, the switch mechanism may be disposed between a user and the rotating mechanism. Thus, when a user switches the rotating mechanism into an "ON" position, the user's arm may be within the field of movement of the rotating mechanism.

In order to prevent injury, the switch is typically located far enough way from the rotating mechanism to avoid a user being struck by the rotating mechanism. Locating the switch at such a distance, however, may inconvenience the user during operation of the rotating mechanism. For example, the user may traverse a long distance, in relation to the rotating mechanism, to activate and deactivate the mechanism.

Additionally, a switch is typically connected to the system through mechanical and electrical connections, thereby adding material and expense to the overall system.

Thus, a need exists for a system and method for safely, easily, and efficiently activating and deactivating a rotating mechanism.

BRIEF SUMMARY OF THE INVENTION

Certain embodiments of the present invention provide a system including a first object or member having a light emitter operatively connected to a power source, and a second object or member having a light receiver operatively connected to a power storage unit. The light receiver receives light emitted from the light emitter and converts the received light into electricity that is stored in the power storage unit. The first object may be remotely located from the second object. For example, the first object may not be physically connected to the second object. The light may be at least one of natural light, infrared radiation, and ultraviolet radiation. Further, the first object may also include a second light receiver operatively connected to a second power storage unit, and the second object may also include a second light emitter operatively connected to a second power source.

Certain embodiments of the present invention also provide a system that includes a rotatable object, a motor, a motion sensor, and a controller. The rotatable object is connected to a drive shaft, which includes a detectable member. The motor is operatively connected to the drive shaft, such that the motor is configured to rotate the rotatable object through the drive shaft. The motion sensor is proximate the detectable member, and is configured to detect motion of the rotatable object by sensing motion of the detectable member. The controller is in communication with the motor and the motion sensor. The controller receives velocity signals detected by the motion sensor. The controller is programmed to operate the motor to automatically rotate the rotatable object at a first velocity upon a first manipulation, such as a user spinning the rotatable object, until a second manipulation, such as the user spinning the rotatable object at a different velocity or stopping the rotatable object by holding the rotatable object still.

Certain embodiments of the present invention also provide a dart game system that includes a power source, a motive member, a rotatable member, a motion sensor, and a controller. The motive member may include a light emitter operatively connected to a power source. The motive member is configured to move the rotatable member, and/or provide energy to the rotatable member that may be stored by the rotatable member and utilized for rotation. The rotatable member may include a standard dartboard having distinct scoring segments, such as shown and described in U.S. Pat. No. 6,974,133, entitled "Electronic Dart Golf Game," issued Dec. 13, 2005, which is hereby incorporated by reference in its entirety.

The rotatable member may include a detectable member and a light receiver operatively connected to a power storage unit. The motive member is configured to rotate the rotatable member through the light receiver receiving light emitted from the light emitter and converting the received light into electricity that is stored in the power storage unit. The stored electricity may then be used to operate a motor connected to the rotatable member in order to rotate the rotatable member.

The motion sensor is proximate the detectable member, and is configured to detect motion of the rotatable object by sensing motion of the detectable member. The detectable member may be positioned around the rotatable member, or around a drive shaft that connects to the rotatable member to an associated motor.

The controller is in communication with the motive member and the motion sensor. The controller receives velocity signals from the motion sensor, and may be programmed to operate the motive member to automatically rotate the rotatable object at a first velocity upon a first manipulation until a second manipulation.

Figure 1:
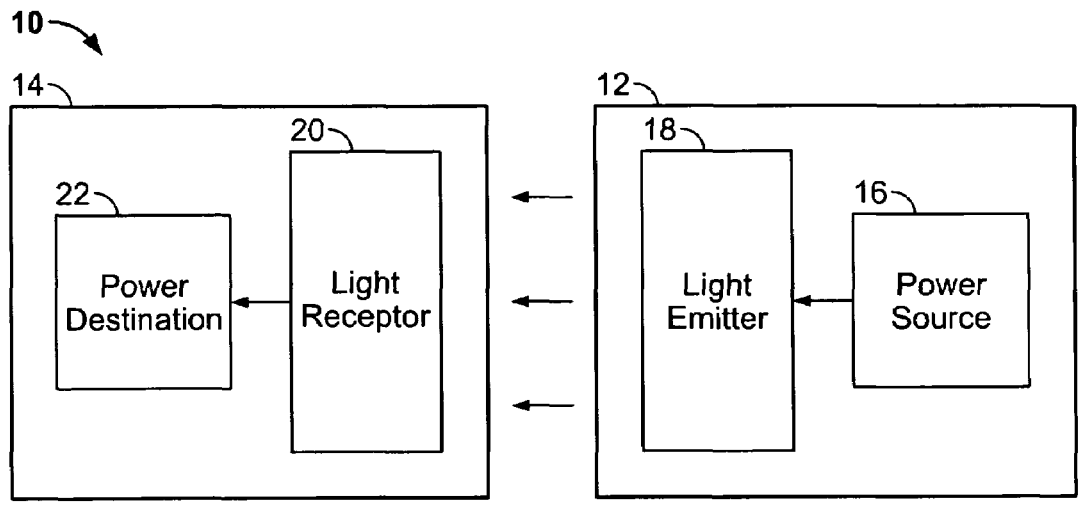
FIG. 1 illustrates a schematic diagram of a non-contact power transfer system, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a schematic diagram of a non-contact power transfer system 10, according to an embodiment of the present invention. The system 10 includes a first object 12 and a second object 14. The objects, members or entities, 12 and 14 can be various machines, parts, components, systems, and the like. For example, the objects 12 and 14 may be parts of an electronic gaming system. The first object 12 may be configured to provide energy to the rotatable second object 14, or vice versa. The first object 12 and the second object 14 may be housed within or on a self-contained unit, such as an electronic gaming system.

The objects 12 and 14 may be rotatable dartboards, such as shown and described in U.S. Pat. No. 5,496,039, entitled "Dart Game Apparatus," which is hereby incorporated by reference in its entirety. Alternatively, one of the first and second objects 12 and 14 may be a rotatable base connected to a plurality of dartboards, and one of the objects 12 and 14 may be a device that rotates the rotatable base or mount. The rotatable base or mount may be a target assembly having a hub connected to a plurality of dartboards. The plurality of dartboards connected to the hub through arms may also be configured to rotate. Thus, a non-contact power transfer system 10 may be used to rotate the hub, while separate non-contact power transfer systems 10 may be used to rotate each of the dartboards.

The first object 12 includes a power source 16 operatively connected to a light emitter 18. The power source 16 may be an AC power source connected to the light emitter 18 through wires, circuit traces, or may be wirelessly connected. The power source 16 may be an energizing unit that is configured to operatively connect to a main source of electrical power, such as a standard wall outlet. The power source 16 acts to energize the light emitter 18, and provide power thereto for operation. The light emitter 18 may be configured to emit various types of light, including natural light, infrared light, ultraviolet radiation, or the like. The first object 12 may, for example, be a power source that imparts motion to the second object 14, which may be a rotating dartboard, or rotating mount connected to a plurality of dartboards, such as shown and described in U.S. Pat. No. 5,496,039.

The second object 14 includes a light receptor 20 that is operatively connected to a power destination 22, such as a power storage unit, or an internal device to be powered. The light receptor 20 is configured to receive light emitted by the light emitter 18, convert the light into energy, and pass the energy to the power destination 22 through appropriate connections (e.g., through wires, circuit traces, wireless connections, or the like). The light receptor 20 may be, for example, a solar cell array.

In operation, light is generated at the light emitter 18, which is powered by electricity generated at the power source 16. Light radiation is focused at the light receptor 20, which converts the light radiation back to electricity. The non-contact transfer of energy between the first and second objects 12 and 14, respectively, allows for power transfer to the second object 14, which may not be connected to a power source in a conventional manner.

Figure 2:
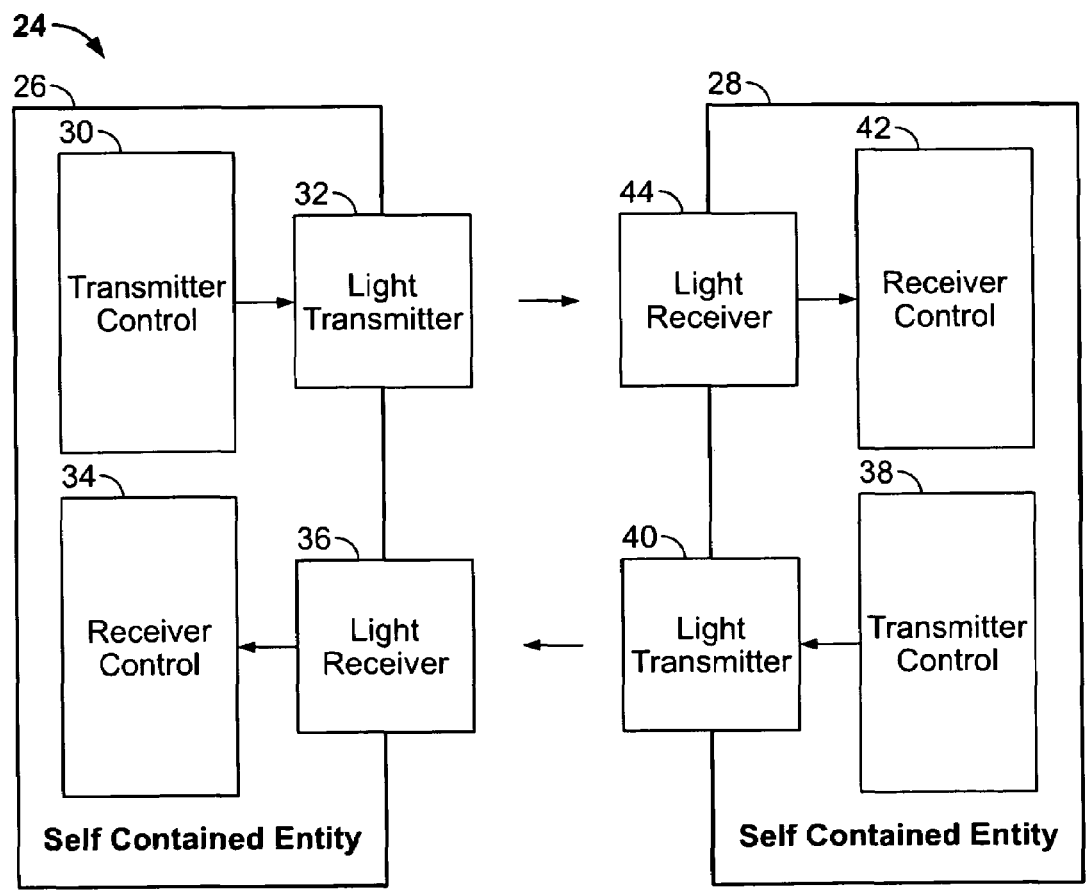
FIG. 2 illustrates a schematic diagram of a non-contact bi-directional system, according to an embodiment of the present invention.

FIG. 2 illustrates a schematic diagram of a non-contact bi-directional system 24, according to an embodiment of the present invention. The system 24 includes a first self-contained object, member or entity 26, and a second self-contained object, member or entity 28. The first entity 26 includes a first transmitter control 30 operatively connected to a first light transmitter 32. The first entity 26 also includes a first receiver control 34 operatively connected a first light receiver 36. The first self-contained entity 26 and the second self-contained entity 28 may be dartboards, target assemblies, or the like, such as shown and described in U.S. Pat. No. 5,496,039, entitled "Dart Game Apparatus."

Similarly, the second entity 28 includes a second transmitter control 38 operatively connected to a second light transmitter 40, which is aligned with, and configured to focus light upon, the first light receiver 36. The second entity 28 also includes a receiver control 42 operatively connected to a second light receiver 44, which is aligned with, and configured to receive light from, the first light transmitter 32.

As shown in FIG. 2, the first and second entities 26 and 28 are separate and distinct from one another. There is no physical connection between the first and second entities 26 and 28. Communication of power and/or data between the entities 26 and 28 is achieved through the entities 26 and 28 transmitting modulating light between one another, and demodulating the received light. The transmitters 32 and 40 may be positioned at various locations on the entities 26 and 28, respectively. The entities 26 and 28 may rotate with respect to one another, and light may be received by the relevant receivers at certain times during the rotation. For example, if the entity 28 axially rotates with respect to the entity 26, the transmitters 32 and 40 will not be aligned with the corresponding receivers 44 and 36 during the entire rotation, if the entity 26 remains fixed. Upon further rotation, the transmitters 32 and 40 will be aligned with the receivers 44 and 36, whereby the receivers 44 and 36 receive the light energy from the transmitters 32 and 40.

Thus, certain embodiments of the present invention provide a system and method of transferring energy between objects that are not physically connected to one another. Embodiments of the present invention provide a system and method of efficiently transferring power between components of a system without taking up too much space.

Figure 3:
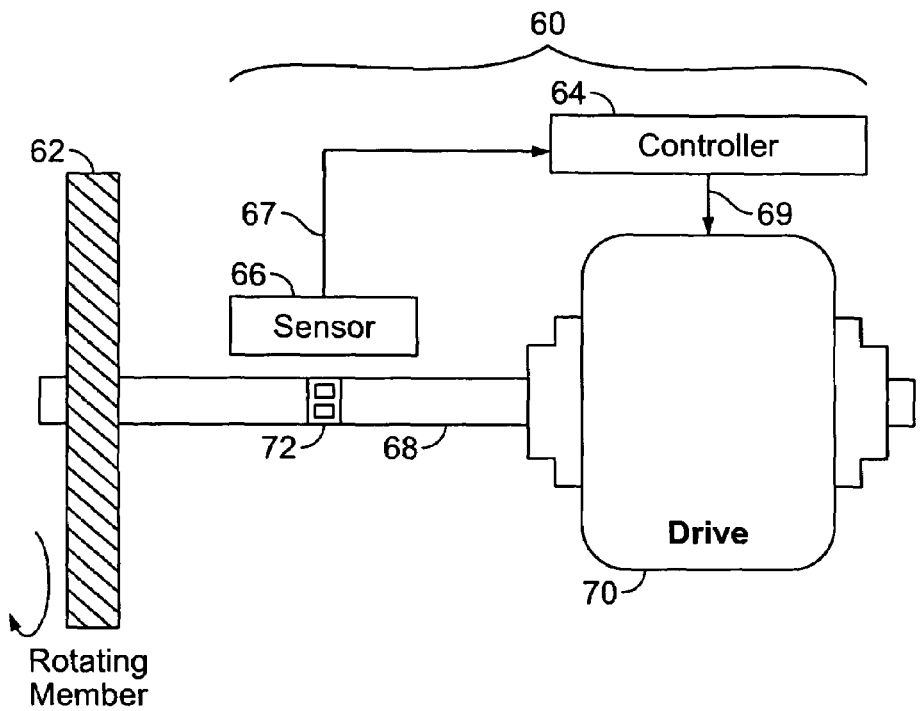
FIG. 3 illustrates a schematic diagram of a control system for a rotatable object according to an embodiment of the present invention.

FIG. 3 illustrates a schematic block diagram of a control system 60 for a rotatable object 62 according to an embodiment of the present invention. The control system 60 includes a controller 64, such as a processing unit, in electrical communication with a motion sensor 66 and a motor 70 through connections 67 and 69, respectively, both of which may be wired or wireless connections. The motion sensor 66 may be an optical sensor configured to sense a corresponding slotted optical encoder. The controller 64 is configured to control operation of the motor 70.

The rotatable object 62 may be a dartboard, or a plurality of dartboards connected to a rotatable mount, such as shown and described in U.S. Pat. No. 5,496,039, entitled "Dart Game Apparatus," which is hereby incorporated by reference in its entirety. The rotatable object 62 is connected to a drive shaft 68, which is in turn rotatably connected to the motor 70, which is configured to rotate the drive shaft 68, and therefore the object 62.

The drive shaft 68 may include a detectable member 72 that is configured to be detected by the motion sensor 66. The detectable member 72 may be a slotted encoder, if the motion sensor 66 is an optical sensor. Alternatively, the detectable member 72 and the motion sensor 66 may be various other types of sensing assemblies, including electromagnetic, ultrasonic, or mechanical sensing assemblies. For example, the motion sensor 66 may be an electromagnetic sensing device and the detectable member 72 may be a magnet.

Also, alternatively, the drive shaft 68 may not include a detectable member 72. Instead, the motion sensor 66, which may be an optical sensor, may be capable of picking up enough reflection from an integrally formed detectable member on the drive shaft, such as a material on the drive shaft 68, such as plastic. For example, the drive shaft 68 or another component (such as a rotating dartboard) may include solar panel reflectors attached to printed circuit boards. The motion sensor 66 may pick up enough reflection from these reflectors in order to sense the motion of the drive shaft 68 or rotating member.

Optionally, the rotatable object 62 may be the second object 14, while the motive unit may be the first object 12, shown and described above with respect to FIG. 1. In this case, the detectable member 72 may be positioned around the circumference of the rotatable member 62, or around a central stud or drive shaft (not shown) extending rearwardly from the rotatable member 62. The sensor 66 may then be positioned proximate the detectable member 72.

As the rotatable object 62 rotates, the drive shaft 68 also rotates. The motion sensor 66 senses rotation of the drive shaft 68 through the detectable member 72. The sensor 66 then sends a velocity signal regarding the sensed velocity of the drive shaft 68 to the controller 64 through the connection 67. The controller 64 receives the velocity signal from the motion sensor 66 through the connection 67 and determines the velocity of the drive shaft 68, and therefore the object 62, through an analysis of the velocity signal.

In order to activate the control system 60, a user manually rotates the rotatable object 62. The motion sensor 66 detects rotation of the drive shaft 68 through the detectable member 72 and relays a corresponding velocity signal to the controller 64 through the connection 67. The controller 64 then determines whether the motion imparted to the rotatable object 62 is sufficient to direct the motor 70 to maintain or increase rotation. For example, if the rotatable object 62 is manually rotated at a first angular velocity, the controller 64 may not activate the motor 70 to continue rotating the rotatable object 62. However, if the rotatable object 62 is manually rotated at an angular velocity that exceeds the first angular velocity, the controller 64 may send an activation signal to the motor to rotate the rotatable object 62 at a second velocity, which may be the same as the velocity at which the rotatable object 62 was manually rotated. Alternatively, once the rotatable object 62 is manually rotated, the controller 64 may send a signal to the motor 70 to maintain rotation of the rotatable object 62 at the velocity imparted to the rotatable object by the user, or at a lower or higher velocity.

The controller 64 directs the motor 70 to continue rotation of the rotatable object 62 at the same velocity until the rotatable object 62 is manipulated, or otherwise engaged by a user. For example, if a user imparts additional spinning force into the rotatable object 62, thereby spinning the rotatable object 62 at a higher velocity, the motion sensor 66 detects the velocity change through the detectable member 72. The controller 64 receives the changing velocity signal through the connection 67 and operates the motor 70 to maintain rotation of the rotatable object at that velocity. If, however, a user engages the rotatable object to stop rotation, the controller 64 directs the motor 70 to deactivate automatic rotation, thereby ceasing automatic rotation of the rotatable member 62.

Figure 4:
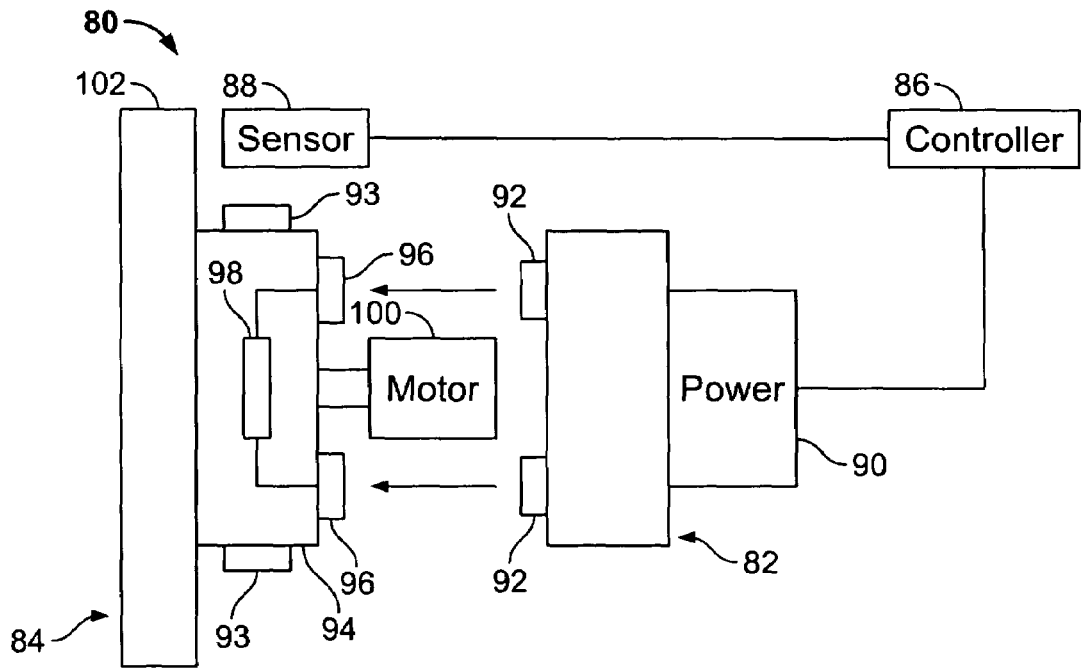
FIG. 4 illustrates a schematic diagram of a rotatable dart game system according to an embodiment of the present invention.

FIG. 4 illustrates a schematic diagram of a rotatable dart game system 80 according to an embodiment of the present invention. The system 80 includes a motive member 82 and a rotatable member 84. The motive member 82 is in electrical communication with a controller 86, which is also in communication with a motion sensor 88.

The motive member 82 includes a power source 90 that supplies power to at least one light emitter 92. The light emitter 92 is configured to emit light toward the rotatable member 84.

The rotatable member 84 includes a base 94 comprising light detectors 96 oriented toward the light emitters 92. A detectable member 93 is positioned around a circumference of the base 94 and is proximate the motion sensor 88. Alternatively, the base 94 may not include a separate detectable member 93, because the motion sensor 88 may be capable of detecting motion from the base 94 itself. The light detectors 96 are configured to receive light from the light emitters 92, and transfer the light energy to a power storage unit 98, which is configured to convert the light energy into electrical energy. The power storage unit 98 is in electrical communication with a motor 100, which is configured to use the stored electrical energy to rotate the rotatable member 84. A standard dart board 102 having distinct scoring segments may be mounted to the base 94 such that the dart board 102 is distally located from the motive member 82. Optionally, instead of the dart board 102, the base 94 may be secured to a hub that is integrally connected to a plurality of arms. A dartboard may be mounted to distal ends of each of one the arms.

Thus, certain embodiments of the present invention provide a system and method for activating and deactivating rotation of a rotatable member without a separate and distinct switch. Further, embodiments of the present invention provide a system and method for safely, easily, and efficiently activating and deactivating the rotatable member.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An apparatus comprising:
   a first member comprising a light emitter operatively connected to a power source, wherein the power source is configured to energize the light emitter; and a second member comprising a light receiver operatively connected to a power storage unit, said second member being configured to rotate, wherein said light receiver receives light emitted from said light emitter and converts the received light into electricity that is stored in said power storage unit, and wherein said second member uses the electricity stored in said power storage unit to rotate.

2. The apparatus of claim 1, wherein said first member is remotely located from said second member.

3. The apparatus of claim 1, wherein said first member is not physically connected to said second member.

4. The apparatus of claim 1, wherein the light is at least one of natural light, infrared radiation, and ultraviolet radiation.

5. The apparatus of claim 1, wherein said first member further comprises a second light receiver operatively connected to a second power storage unit, and wherein said second member further comprises a second light emitter operatively connected to a second power source.

6. The apparatus of claim 1, wherein at least one of said first and second members is a first rotatable dartboard.

7. The apparatus of claim 1, wherein said second member is a rotatable hub integrally connected to a plurality of arms, wherein a dartboard is mounted to an end of each of said plurality of arms.

8. A system comprising:
a rotatable member connected to a drive shaft, said drive shaft comprising a detectable member;
a motor operatively connected to said drive shaft, said motor configured to rotate said rotatable member through said drive shaft;
a motion sensor proximate said detectable member, said motion sensor detecting motion of said rotatable member by sensing motion of said detectable member; and
a controller in communication with said motor and said motion sensor, said controller receiving velocity signals from said motion sensor, said controller being programmed to operate said motor to automatically rotate said rotatable member at a first velocity upon a first manipulation of said rotatable member until a second manipulation of said rotatable member.

9. The system of claim 8, wherein said controller is programmed to operate said motor to cease automatic rotation of said rotatable member at the first velocity when the second manipulation stops rotation of said rotatable member.

10. The system of claim 9, wherein said controller is programmed to operate said motor to automatically rotate said rotatable member at a second velocity upon the second manipulation.

11. The system of claim 8, wherein said detectable member is a slotted encoder, and said motion sensor is an optical decoder.

12. The system of claim 8, wherein said detectable member is a portion of said drive shaft.

13. The system of claim 8, wherein said rotatable member is a dart board.

14. The system of claim 8, wherein said rotatable member is a target assembly comprising a hub connected to a plurality of arms, and a plurality of dartboards, wherein one of said plurality of dartboards is secured to each of said plurality of arms.

15. A dart game system comprising:
a power source;
a motive member having a light emitter operatively connected to a power source;
a rotatable member comprising a detectable member and a light receiver operatively connected to a power storage unit, said motive member configured to rotate said rotatable member through said light receiver receiving light emitted from said light emitter and converting the received light into electricity that is stored in said power storage unit;
a motion sensor proximate said detectable member, said motion sensor detecting motion of said rotatable object by sensing motion of said detectable member; and
a controller in communication with said motive member and said motion sensor, said controller receiving velocity signals from said motion sensor, said controller being programmed to operate said motive member to automatically rotate said rotatable object at a first velocity upon a first manipulation of said rotatable object until a second manipulation of said rotatable object.

16. The system of claim 15, wherein said motive member is remotely located from said rotatable member.

17. The system of claim 15, wherein said motive member is not physically connected to said rotatable member.

18. The system of claim 15, wherein said rotatable member further comprises a second light receiver operatively connected to a second power storage unit, and wherein said motive member further comprises a second light emitter.

19. The system of claim 15, wherein said rotatable member is rotatable standard dartboard having distinct scoring segments.

20. The system of claim 15, wherein said controller is programmed to operate said motive member to cease automatic rotation of said rotatable object at the first velocity when the second manipulation stops rotation of said rotatable object.

21. The system of claim 20, wherein said controller is programmed to operate said motive member to automatically rotate said rotatable object at a second velocity upon the second manipulation.

22. The system of claim 15, wherein said detectable member is a slotted encoder, and said motion sensor is an optical decoder.

23. The system of claim 15, wherein said detectable member is an integral portion of said rotatable member.

24. The system of claim 15, wherein said rotatable member is a target assembly comprising a hub connected to a plurality of arms, and a plurality of dartboards, wherein one of said plurality of dartboards is secured to each of said plurality of arms.

* * * * *